United States Patent [19]
Mallory et al.

[11] Patent Number: 5,496,649
[45] Date of Patent: Mar. 5, 1996

[54] CROSS-LINKED PVOH COATINGS HAVING ENHANCED BARRIER CHARACTERISTICS

[75] Inventors: William M. Mallory, Farmington; Eber C. Bianchini, Rochester, both of N.Y.

[73] Assignee: Mobil Oil Corp., Fairfax, Va.

[21] Appl. No.: 278,458

[22] Filed: Jul. 21, 1994

[51] Int. Cl.$^6$ .............................. B32B 27/08; C08K 3/22; B05D 3/04
[52] U.S. Cl. .......................... 428/518; 428/516; 428/910; 428/512; 428/513; 428/461; 427/340; 427/393.5; 427/412.3; 525/56; 525/61
[58] Field of Search ..................................... 428/518, 910, 428/516; 427/340, 393.5, 412.3; 525/56, 61

[56] References Cited

U.S. PATENT DOCUMENTS

| | | |
|---|---|---|
| 2,130,212 | 9/1938 | Watkins . |
| 2,333,796 | 11/1943 | Kenyon et al. . |
| 2,362,026 | 11/1944 | Quist . |
| 2,419,281 | 4/1947 | Noble . |
| 2,897,092 | 7/1959 | Miller . |
| 2,916,468 | 12/1959 | Yundt . |
| 3,033,842 | 5/1962 | Holtschmidt . |
| 3,099,646 | 7/1963 | Scardiglia et al. . |
| 3,221,079 | 11/1965 | Harris . |
| 3,232,916 | 2/1966 | Fogle . |
| 3,275,575 | 9/1966 | Fogle . |
| 3,282,729 | 11/1966 | Richardson . |
| 3,294,577 | 12/1966 | Mayer . |
| 3,518,242 | 6/1970 | Chrisp . |
| 3,702,844 | 11/1972 | Ofstead et al. . |
| 3,719,621 | 3/1973 | Vogt et al. . |
| 4,154,912 | 5/1979 | Philipp et al. . |
| 4,214,039 | 7/1980 | Steiner et al. . |
| 4,224,262 | 9/1980 | Baird, Jr. et al. . |
| 4,235,365 | 11/1980 | Yoshii et al. . |
| 4,240,993 | 12/1980 | Sun . |
| 4,254,169 | 3/1981 | Schroeder . |
| 4,262,067 | 4/1981 | Phillipp et al. . |
| 4,272,470 | 6/1981 | Hsu et al. . |
| 4,275,119 | 6/1981 | Weiner . |
| 4,276,330 | 6/1981 | Stanley et al. . |
| 4,277,572 | 7/1981 | Fujiwara et al. . |
| 4,284,671 | 8/1981 | Cancio et al. . |
| 4,288,477 | 9/1981 | Bordini et al. . |
| 4,357,402 | 11/1982 | Sheibley et al. . |
| 4,376,183 | 3/1983 | Haskell . |
| 4,416,938 | 11/1983 | Haskell . |
| 4,439,493 | 3/1984 | Hein et al. . |
| 4,475,241 | 10/1984 | Mueller et al. . |
| 4,564,559 | 1/1986 | Wagner, Jr. et al. . |
| 4,650,721 | 3/1987 | Ashcraft . |
| 4,725,646 | 2/1988 | Kobashi et al. . |
| 4,785,049 | 11/1988 | Balaba et al. . |
| 4,927,689 | 5/1990 | Markiewicz . |
| 5,230,963 | 7/1993 | Knoerzer . |

OTHER PUBLICATIONS

T. W. Modi, *Polyvinyl Alcohol*, in Handbook of Water-Soluble Gums and Resins 20.1–20.32 (Robert L. Davidson ed., 1980).

Harold L. Jaffe and Franklin M. Rosenblum, *Poly(Vinyl Alcohol) for Adhesives*, in Handbook of Adhesives 401–407 (Irving Skeist ed., 1990).

*Primary Examiner*—P. C. Sluby
*Attorney, Agent, or Firm*—Alexander J. McKillop; Dennis P. Santini

[57] ABSTRACT

An improved oxygen barrier layer for coating a substrate, such as a polymeric film. The oxygen barrier is a layer of cross-linked polyvinyl alcohol and glyoxal, which exhibits improved barrier characteristics to the transmission of oxygen. The oxygen barrier is produced by coating a solution of polyvinyl alcohol, glyoxal and tensoactive agent onto at least one side of a substrate adapted for receipt of such solution. The polyvinyl alcohol is thereafter cross-linked in the absence of a catalyst to provide the oxygen barrier.

16 Claims, No Drawings

CROSS-LINKED PVOH COATINGS HAVING ENHANCED BARRIER CHARACTERISTICS

BACKGROUND OF THE INVENTION

The present invention relates to cross-linked PVOH coatings having enhanced barrier characteristics and, more particularly, to PVOH coatings which exhibit improved processing characteristics resulting in cross-linked coatings providing improved oxygen barriers especially at high relative humidities.

Poly(vinyl alcohol) ("PVOH") coatings have been applied to various substrates in the past, and are known to provide a barrier to the transmission of oxygen. PVOH, however, is soluble in water and therefore is susceptible to attack by moisture. Various attempts have been made to decrease the sensitivity of PVOH to moisture.

One known method of decreasing the sensitivity of the PVOH coating to moisture is to cross-link the poly(vinyl alcohol). For example, a cross-linking agent and catalyst may be applied along with the poly(vinyl alcohol) such that the agent interconnects and thereby cross-links the poly(vinyl alcohol) molecules as such coating is dried. The catalyst is present to facilitate the cross-linking process.

Commonly owned co-pending application Ser. No. 08/080,602 discloses a polymeric substrate having a cross-linked layer of PVOH adhered thereto. The PVOH layer includes a cross-linking agent such as melamine or urea formaldehyde, which is cross-linked in the presence of a sulfuric acid catalyst. The resultant film exhibits enhanced oxygen barrier characteristics, as compared to barrier films of the prior art.

However, it can be difficult in the prior art films, including the film disclosed in commonly owned co-pending application Ser. No. 08/080,602, now U.S. Pat. No. 5,380,586, to ensure that the layer of poly(vinyl alcohol) cross-links fully throughout itself. In this regard, it is believed that the degree of cross-linking is indicative of the oxygen barrier characteristics of the resultant film. Stated differently, poly(vinyl alcohol) layers that are fully cross-linked tend to exhibit better barrier characteristics than those layers which are less than fully cross-linked.

The prior art films, in an attempt to achieve maximum cross-linking, are often dried and/or stored for an extended period of time. For example, it may be necessary to store a film for weeks, or even months, before such film has reached its point of maximum cross-linking. The aforementioned storage period increases the production time and cost for manufacturing polymeric films having cross-linked PVOH coatings thereon.

There is therefore a need in the art for a method of providing a PVOH coating on a substrate, such as a polymeric film, which upon drying is substantially 100% cross-linked thereby eliminating or, at the minimum, greatly reducing the storage period. The resultant coating should exhibit improved oxygen barrier characteristics and improved rubbing resistance especially at high relative humidities. Moreover, the resultant coating should bond firmly to the underlying substrate.

SUMMARY OF THE INVENTION

The present invention, which addresses the needs of the prior art, relates to a method of providing an improved moisture resistant oxygen barrier having a reduced number of imperfections onto the surface of a substrate. The method includes the step of coating the surface of the substrate with a solution of poly(vinyl alcohol), glyoxal and tensoactive agent and thereafter cross-linking the poly(vinyl alcohol) in the absence of a catalyst to provide the moisture resistant oxygen barrier.

In a preferred embodiment, the poly(vinyl alcohol) has a hydrolysis level of above about 99% and, preferably, about 99.5%. The poly(vinyl alcohol) is preferably a low viscosity grade PVOH. In particular, the viscosity of the PVOH is preferably from about 5 cps to about 15 cps (at 4% solution and 20° C.). Moreover, the tensoactive agent is preferably a $C_4$ to $C_{10}$ alcohol, particularly 1-octanol.

The present invention also provides a polymeric film structure having an improved oxygen barrier firmly bonded to an underlying substrate. The film structure is produced by the process of preparing a solution of poly(vinyl alcohol) and glyoxal. The process includes the further step of adding an effective amount of tensoactive agent to the solution to reduce foaming of the solution during both agitation and application of the solution and to reduce the solution's surface tension whereby improved bonding between the barrier and the substrate is achieved. The process includes the further step of coating the solution on at least one side of the substrate and thereafter cross-linking the poly(vinyl alcohol) in the absence of a catalyst to provide the oxygen barrier.

In a preferred embodiment, the coated substrate is dried at a temperature of from about 180° F. to about 300° F. for period of from about 4 seconds to about 8 seconds. The coating is substantially 100% cross-linked upon completion of the drying period.

As a result, the present invention provides an improved PVOH coating for application on a substrate which is substantially 100% cross-linked upon drying of the applied coating. The cross-linking time is therefore reduced from a matter of weeks, or even months, to a matter of seconds.

Moreover, the resultant cross-linked coating exhibits improved oxygen barrier characteristics and improved rubbing resistance. The bonding between the barrier and the substrate is also enhanced. Finally, the manufacturing process is facilitated in that the present coating exhibits a reduced tendency to foam during both agitation and application of the solution and also exhibits an enhanced ability to "wet-out" when applied to the substrate thereby providing a film having an improved lay-flat quality.

DETAILED DESCRIPTION OF THE INVENTION

The films of the present invention are produced by coating at least one side of a substrate with a solution of poly(vinyl alcohol), glyoxal and tensoactive agent. The poly(vinyl alcohol) is thereafter cross-linked to provide an oxygen barrier, i.e., a polymeric layer which resists the transmission of oxygen therethrough.

The improved oxygen barrier layer of the present invention may be adhered to any number of substrates, including polymeric films, boxboards, metallic films and paper. The oxygen barrier layer is preferably adhered to a polymeric film such as a polyolefin. One particularly preferred polyolefin is polypropylene.

To ensure that the oxygen barrier layer of the present invention properly adheres to the substrate, the substrate preferably includes at least one side that is adapted for receipt of the layer. Particularly, the side of the substrate to be coated should have surface properties which facilitate the securing of a poly(vinyl alcohol) layer thereto. For example, the side to be coated may be treated with a primer such as poly(ethyleneimine). Of course, other suitable primers may also be utilized. The side to be coated may also be adapted for subsequent receipt of a poly(vinyl alcohol) layer during formation of the substrate itself. For example, a polymeric substrate, e.g., polypropylene, may include a material such as maleic acid which improves the ability of poly(vinyl alcohol) to bond thereto. Finally, the substrate may include a side which is naturally adapted for receipt of a poly(vinyl alcohol) layer, i.e., the side to be coated requires no treatment.

As known to those skilled in the art, poly(vinyl alcohol) is typically produced by hydrolyzing poly(vinyl acetate). Specifically, the hydrolysis reaction replaces the acetate groups with alcohol groups. The more acetate groups that are replaced, the greater the hydrolysis of the PVOH. It is believed that the presence of more alcohol groups (i.e., greater hydrolysis) provides better barrier properties.

However, even after hydrolysis of the PVOH, a certain number of acetate groups remain attached to the PVOH molecule. For example, in a 95% hydrolyzed PVOH approximately 5% of the originally-present acetate groups remain attached to the molecule, whereas in a 99% hydrolyzed PVOH approximately 1% of the originally-present acetate groups remain attached to the molecule.

Poly(vinyl alcohol) may be produced with various viscosities and various degrees of hydrolysis. Viscosity is typically a function of the molecular weight of the PVOH molecule. Specifically, a solution of PVOH in which the individual molecules are relatively large (i.e., a high molecular weight PVOH) tends to have a higher viscosity than a solution of PVOH in which the individual molecules are relatively small (i.e., a low molecular weight PVOH). It is believed that Van der Waals forces develop between the larger-sized molecules because such molecules tend to align themselves with one another, thus increasing the viscosity of the PVOH.

A poly(vinyl alcohol) such as Elvanol 71-30 (produced by Du Pont) is typically referred to as a medium viscosity, fully hydrolyzed PVOH. Specifically, the degree of hydrolysis of a fully hydrolyzed PVOH is about 98%. Further, the viscosity of a medium viscosity grade PVOH such as Elvanol 71-30 is about 30 cps at 4% solution and 20° C.

Another commercially available PVOH is Elvanol 75-15 (also produced by Du Pont), which is a low viscosity, fully hydrolyzed PVOH. Specifically, the degree of hydrolysis is about 98% and the viscosity is about 13 cps at 4% solution and 20° C.

Still another commonly available PVOH is Elvanol 90-50 (also produced by Du Pont), which is a low viscosity, super hydrolyzed PVOH. The degree of hydrolysis in a super hydrolyzed PVOH is about 99.5%. The viscosity of a low viscosity grade PVOH such as Elvanol 90-50 is about 13 cps at 4% solution and 20° C.

Although poly(vinyl alcohol) provides a barrier to the transmission of oxygen, it is soluble in water and therefore susceptible to attack by moisture. As a result, poly(vinyl alcohol) layers which will be exposed to moisture are typically cross-linked. The cross-linking of the layer substantially reduces its susceptibility to attack by moisture.

However, it is often difficult to readily and consistently produce a poly(vinyl alcohol) layer which, when dried, becomes fully cross-linked. The current procedure for producing oxygen barriers of poly(vinyl alcohol) often requires the film to be stored for a period of weeks, or even months, following manufacture of the film to allow the poly(vinyl alcohol) layer to fully cross-link. This storage requirement increases both the production cost and production time. It also results in the film being exposed to moisture prior to becoming fully cross-linked, which may negatively affect the final properties of the film.

It has been discovered herein that a formulation of poly(vinyl alcohol), glyoxal and a tensoactive agent will cross-link upon drying of the applied coating, thereby eliminating the need to store the film. This cross-linking occurs in the absence of an acid catalyst and results in an improved oxygen barrier, as compared to other cross-linked PVOH coatings.

The poly(vinyl alcohol) is preferably a low viscosity grade PVOH having a viscosity of from about 5 cps to 15 cps (at 4% solution and 20° C.). As mentioned above, a low molecular weight PVOH includes relatively small PVOH molecules, thereby providing a PVOH formulation having a lower viscosity. It is believed that the smaller PVOH molecules, together with the relatively small glyoxal cross-linking molecules, allow a "tightly packed" matrix to be formed. As a result, the formed matrix is resistant to the penetration of oxygen therethrough.

Glyoxal, also known as ethanedial or oxalaldehyde, is a two carbon dialdehyde having an empirical formula $C_2H_2O_2$. In solution, glyoxal exists as a mixture of hydrates, dimers and oligomers. The glyoxal utilized in the present invention is preferably an aqueous 40% by weight solution and is present in the resultant cross-linked coating in an amount of from about 5% to 30% by weight and, preferably, from about 15% to 25% by weight.

Glyoxal is a relatively small molecule, as compared to the PVOH and as compared to other various known cross-linkers. As a result, it is believed the glyoxal molecules tend to readily "fit" between adjacent PVOH molecules such that the cross-linked layer has a minimum of void space. It is further believed that the reduced void space enhances the oxygen barrier characteristics of the resultant film.

As mentioned above, it has been discovered herein that the cross-linking process between the PVOH and the glyoxal does not require a catalyst. This lack of need may result from the functionally active condition of the glyoxal, and is significant in that the typically employed catalysts (e.g., acid catalysts) often prove difficult to utilize in a commercial setting. Particularly, such catalysts are extremely corrosive and potentially damaging to the coating machinery. Moreover, the use of a catalyst significantly reduces the pot life of the coating solution.

In a preferred embodiment, the tensoactive agent is added to the solution to reduce foaming during both agitation of the solution and application of the solution to the substrate. The addition of the agent to the solution also reduces the surface tension of the solution, thereby providing better wetout of the poly(vinyl alcohol) on the substrate which in turn results in a barrier layer having an improved lay-flat quality. This reduced surface tension also provides an enhanced bond between the cross-linked coating and the substrate.

It is has been discovered herein that the addition of tensoactive agent, particularly 1-octanol, to a super hydrolyzed low viscosity PVOH such as Elvanol 90-50 provides a coating solution having an unexpectedly low level of surface energy. The reduced surface energy improves the processing characteristics of the solution, particularly the ability of the solution to "wet-out" when applied to the substrate without formation of voids or imperfections, thereby resulting in a coating having enhanced oxygen barrier characteristics.

In a preferred embodiment of the present invention, the tensoactive agent is a $C_4$ to $C_{10}$ alcohol such as octanol, particularly 1-octanol. The octanol is present in the solution in a concentration of from about 5 ppm to 0.5% by weight. The octanol is dispersed throughout the solution and, at the concentrations employed in the present formulation, remains dispersed in the solution. Of course, other suitable tensoactive agents are also contemplated.

Commercially suitable coating processes include a reverse direct gravure process and a smooth rod process. As is known to those skilled in the art, the gravure process typically produces a higher level of foam than the smooth rod process. The tensoactive agent reduces the degree of foaming, while simultaneously, lowering the surface energy off the coating solution. The combination of reduced foaming and lower surface energy provides improved processing characteristics which result in a barrier exhibiting reduced transmission of oxygen, particularly at high relative humidities.

With respect to the gravure process, the coating solution of the present invention preferably includes approximately 200 to 500 ppm of 1-octanol and, more preferably, about 250 ppm of 1-octanol. With respect to the smooth rod process, it has been discovered herein that the coating solution preferably includes from about 5 ppm to about 50 ppm of 1-octanol. This lower level of tensoactive agent provides the above-mentioned improved processing characteristics. In addition, it is believed that this lower level of tensoactive agent reduces the likelihood that the subsequently-formed oxygen barrier will suffer any negative impacts from the inclusion of such agent in the solution.

The solution, which is preferably aqueous, is prepared by adding the poly(vinyl alcohol) to cold water, which is thereafter heated to a temperature sufficient to dissolve the PVOH. The water and dissolved PVOH are then cooled. The cross-linking agent (i.e., the glyoxal) is then added to the cooled PVOH and water. Thereafter, an effective amount of the tensoactive agent is added to the solution. It is this resultant solution that is then coated on the polymeric substrate.

In a preferred embodiment, the aqueous solution includes from about 4% to 148 by weight of solid and, preferably, from about 58 to 108 by weight of solid. This solid content is made up from about 70% to about 95% by weight of poly(vinyl alcohol), from about 5% to 30% by weight of cross-linking agent and from about 5 ppm to 0.5% by weight of octanol.

It has been discovered that the aqueous solution of the present invention is stable in comparison to prior art formulations. This stability, together with the use of the low viscosity PVOH, allows the solid content of the solution to be increased. By increasing the solid content of the solution, the percentage of water in the solution is reduced. Accordingly, the applied coating is more readily dried. This reduced drying time results in an energy savings and/or a speed increase from the coating machinery. It is also believed to facilitate the cross-linking process. Finally, this stability results in a longer pot life for the solution.

Particularly, once the coating is applied to the substrate, the film is rolled through a drying oven. A typical drying oven is approximately 60 feet long and adapted to heat the film to approximately 130° C. The film is rolled through the oven at speeds of about 1000 feet per minute. As the film rolls through the oven, the water in the applied coating is driven off which, in turn, increases the concentration of the solid content. At some point (i.e., at a particular concentration and temperature), the cross-linking process is initiated. This cross-linking process occurs rapidly and completely throughout the PVOH layer such that the film is substantially 100% cross-linked by the time such film leaves the drying oven.

The following examples illustrate the enhanced barrier characteristics of films produced in accordance with the present invention.

EXAMPLE 1

Sample 1 was produced. A solution of Elvanol 71-30, Parez 613 (a methylated melamine formaldehyde) and ammonium chloride was coated onto a polymeric substrate of polypropylene approximately 0.75 mils thick. The solution contained 6% by weight of solid. In turn, the solid contained approximately 83% by weight of PVOH, approximately 15% by weight of methylated melamine formaldehyde and approximately 2% by weight of ammonium chloride.

The substrate was treated with a poly(ethyleneimine) primer prior to application of the coating. The coating was applied to the polypropylene substrate using a reverse direct gravure coating process. Specifically, the coating was applied with a 92Q gravure roll. The control sample was then dried and stored until the layer was fully cross-linked, a process requiring about 3 weeks. The film was then measured for oxygen transmission at 0% relative humidity and 75% relative humidity.

Sample 1 exhibited an oxygen transmission rate of 0.061 cc/100 in$^2$/24 hr at 0% relative humidity; and 0.968 cc/100 in$^2$/24 hr at 758 relative humidity.

EXAMPLE 2

Sample 2 was produced. A Solution of Elvanol 75-15 and Sunrez 740 (a cyclic amide-aldehyde copolymer) was coated onto a polypropylene substrate prepared in accordance with Example 1 by a reverse direct gravure process. The solution contained 8% by weight of solid. In turn, the solid contained approximately 75% by weight of PVOH and approximately 25% by weight of cross-linking agent. The oxygen transmission characteristics of the film were thereafter measured.

Sample 2 exhibited an oxygen transmissive rate of 0.08 cc/100 in$^2$/24 hr at 0% relative humidity and 0.81 cc/100 in$^2$/24 hr at 758 relative humidity.

EXAMPLE 3

Sample 3 was produced. A solution of Elvanol 90-50 and Sunrez 740 was coated onto the polypropylene substrate described in Example 1 by a reverse direct gravure process. The solution contained 8% by weight of solid. In turn, the solid contained approximately 85% by weight of PVOH and approximately 15% by weight of cross-linking agent. The oxygen transmission characteristics of the film were thereafter measured.

Sample 3 exhibited an oxygen transmissive rate of 0.03 cc/100 in$^2$/24 hr at 0% relative humidity and 0.26 cc/100 in$^2$/24 hr at 75% relative humidity.

EXAMPLE 4

Sample 4 was produced. A solution of Elvanol 75-15 and Glyoxal 40 was coated onto the polypropylene substrate described in Example 1 by a reverse direct gravure process. The solution contained 8% by weight of solid. In turn, the solid contained approximately 85% by weight of PVOH and approximately 15% by weight of cross-linking agent. The oxygen transmission characteristics of the film were thereafter measured.

Sample 4 exhibited an oxygen transmissive rate of 0.04 cc/100 in$^2$/24 hr at 0% relative humidity and 0.23 cc/100 in$^2$/24 hr at 75% relative humidity.

EXAMPLE 5

Sample 5 was produced. A solution of Elvanol 90-50 and Glyoxal 40 was coated onto the polypropylene substrate described in Example 1 by a reverse direct gravure process. The solution contained 8% by weight of solid. In turn, the solid contained approximately 75% by weight of PVOH and approximately 25% by weight of cross-linking agent. The oxygen transmission characteristics of the film were thereafter measured.

Sample 5 exhibited an oxygen transmissive rate of 0.06 cc/100 in$^2$/24 hr at 0% relative humidity and 0.13 cc/100 in$^2$/24 hr at 75% relative humidity.

EXAMPLE 6

Sample 6 was produced. A solution of Elvanol 75-15, Glyoxal 40 and 1-octanol was coated onto the polypropylene substrate described in Example 1 by a reverse direct gravure process. The solution contained 8% by weight of solid. In turn, the solid contained approximately 75% by weight of PVOH approximately 25% by weight of cross-linking agent and 250 ppm of 1-octanol. The oxygen transmission characteristics of the film were thereafter measured.

Sample 6 exhibited an oxygen transmissive rate of 0.05 cc/100 in$^2$/24 hr at 0% relative humidity and 0.29 cc/100 in$^2$/24 hr at 75% relative humidity.

EXAMPLE 7

Sample 7 was produced. A solution of Elvanol 90-50, Glyoxal 40 and 1-octanol was coated onto the polypropylene substrate described in Example 1 by a reverse direct gravure process. The solution contained 8% by weight of solid. In turn, the solid contained approximately 85% by weight of PVOH, approximately 15% by weight of cross-linking agent and 250 ppm of 1-octanol. The oxygen transmission characteristics of the film were thereafter measured.

Sample 7 exhibited an oxygen transmission rate of 0.02 cc/100 in$^2$/24 hours at 0% relative humidity and 0.07 cc/100 in$^2$/24 hours at 75% relative humidity.

The results from Examples 1–7 are summarized in the following table:

It is apparent from the data set forth in the previous table that the oxygen barrier characteristics of the films produced in accordance with the present invention are vastly superior to those of the prior art. Particularly, at high relative humidity (e.g., 75%) the oxygen transmission rate (TO$_2$) decreased from highs of 0.81 (Sample 2) and 0.97 (Sample 1) to a low of 0.07 (Sample 7). Moreover, the films produced in accordance with the present invention exhibit improved rubbing resistance upon drying as compared to those films produced employing various prior art formulations.

Thus, while there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A method of providing an improved moisture-resistant oxygen barrier onto a surface of a substrate comprising:

coating said surface of said substrate with a solution of poly(vinyl alcohol), glyoxal and a C$_4$ to C$_{10}$ alcohol, wherein said solution includes an amount of glyoxal sufficient to substantially 100% crosslink said poly(vinyl alcohol) and from about 5 ppm to about 0.5% by weight of said alcohol; and drying said coated substrate to substantially 100% crosslink said poly(vinyl alcohol) in the absence of a catalyst to provide said moisture-resistant oxygen barrier.

2. The method according to claim 1, wherein said poly(vinyl alcohol) has a viscosity of from about 5 cps to about 15 cps at 4% solution and 20° C.

3. The method according to claim 1, wherein said poly(vinyl alcohol) is hydrolyzed to a degree of about 99.5%.

4. The method according to claim 1, wherein said alcohol is octanol.

5. The method according to claim 4, wherein said octanol is 1-octanol.

6. The method according to claim 1, wherein said solution is prepared by the steps of:

dissolving said poly(vinyl alcohol) in water and thereafter adding said glyoxal; and adding an effective amount of said alcohol to said water to reduce the surface tension of said solution whereby improved bonding between said barrier and said substrate is achieved.

7. The method according to claim 1, wherein said coated substrate is dried at a temperature of from about 180° F. to about 300° F. for a period of from about 4 seconds to about

|  | PVOH | Crosslinking Agent | Tensoactive Agent | Surface Tension | TO$_2$ (0% RH) | TO$_2$ (75% RH) | Rubbing Res. (% removed after drying) | Rubbing Res. (% removed after 3 wks) |
|---|---|---|---|---|---|---|---|---|
| Sample 1 | 71-30 | Parez 613 | No | — | 0.06 | 0.97 | 95–100% | 0 |
| Sample 2 | 75-15 | Sunrez 740 | No | 41.3 | 0.08 | 0.81 | 90–100% | 0 |
| Sample 3 | 90-50 | Sunrez 740 | No | 41.9 | 0.03 | 0.26 | 90–100% | 0 |
| Sample 4 | 75-15 | Glyoxal 40 | No | 43.3 | 0.04 | 0.23 | 0 | 0 |
| Sample 5 | 90-50 | Glyoxal 40 | No | 42.6 | 0.06 | 0.13 | 0 | 0 |
| Sample 6 | 75-15 | Glyoxal 40 | Yes | 39.3 | 0.05 | 0.29 | 0 | 0 |
| Sample 7 | 90-50 | Glyoxal 40 | Yes | 30.9 | 0.02 | 0.07 | 0 | 0 |

TO$_2$ = cc/100 in$^2$/atm/24 hr
Surface Tension = dyne/cm 8 seconds whereby said coating is substantially 100% crosslinked.

8. The method according to claim 1, wherein said solution includes from about 5% to about 10% by weight of solid, said solid comprising from about 70% to about 95% by weight of poly(vinyl alcohol) having a viscosity of from about 5 cps to about 15 cps ate4% solution and 20° C. and which is hydrolyzed to a degree of about 99.5%, from about 5% to about 30% by weight of glyoxal and from about 5 ppm to about 0.5% by weight of 1-octanol.

9. The method according to claim 1, wherein said coating step is accomplished through a smooth rod process, and wherein said solution includes from about 5 ppm to about 50 ppm of a $C_4$ to $C_{10}$ alcohol.

10. The method according to claim 9, wherein said $C_4$ to $C_{10}$ alcohol is 1-octanol.

11. The method according to claim 1, wherein said coating step is accomplished through a reverse direct gravure process, and wherein said solution includes from about 200 ppm to about 500 ppm of a $C_4$ to $C_{10}$ alcohol.

12. The method according to claim 11, wherein said $C_4$ to $C_{10}$ alcohol is 1-octanol.

13. A polymeric film structure, comprising:

an improved oxygen barrier bonded to an underlying substrate produced by the process of preparing a solution of poly(vinyl alcohol) and glyoxal, wherein said solution includes an amount of glyoxal sufficient to substantially 100% crosslink said poly(vinyl alcohol);

adding from about 5 ppm to about 0.5% of a $C_4$ to $C_{10}$ alcohol to said solution to reduce the surface tension of said solution whereby improved bonding between said barrier and said substrate is achieved; and coating said solution on at least one side of said substrate and thereafter drying said coated substrate to substantially 100% crosslink said poly(vinyl alcohol) in the absence of a catalyst to provide an effective oxygen barrier thereon.

14. The structure according to claim 13, wherein said poly(vinyl alcohol) has a viscosity of from about 5 cps to about 15 cps at 4% solution and 20° C. and which is hydrolyzed to a degree of about 99.5%.

15. The structure according to claim 13, wherein said $C_4$ to $C_{10}$ alcohol is 1-octanol.

16. The structure according to claim 14, wherein said solution includes from about 58 to about 10% by weight of solid, said solid comprising from about 70% to about 95% by weight of poly(vinyl alcohol) having a viscosity of from about 5 cps to about 15 cps at 4% solution and 20° C. and which is hydrolyzed to a degree of about 99.5%, from about 5% to about 30% by weight of glyoxal and from about 5 ppm to about 0.5% of 1-octanol.

\* \* \* \* \*

UNITED STATES PATENT AND TRADEMARK OFFICE
CERTIFICATE OF CORRECTION

PATENT NO. : 5,496,649
DATED : March 5, 1996
INVENTOR(S) : Eber C. Bianchini et al.

It is certified that error appears in the above-indentified patent and that said Letters Patent is hereby corrected as shown below:

Col. 9, line 7, Claim 8, "ate" should read --at--.

Col. 10, line 20, Claim 16, "58" should read --5%--.

Signed and Sealed this

Eleventh Day of June, 1996

Attest:

BRUCE LEHMAN

Attesting Officer

Commissioner of Patents and Trademarks